United States Patent [19]
Deitrich et al.

[11] Patent Number: 5,924,384
[45] Date of Patent: Jul. 20, 1999

[54] ANIMAL CAGE ASSEMBLY AND COMBINATION WATER BOTTLE HOLDER AND FEEDER

[75] Inventors: Eric A. Deitrich, Woodbine; John E. Sheaffer, Perryville, both of Md.

[73] Assignee: Lab Products, Inc., Seaford, Del.

[21] Appl. No.: 08/542,394

[22] Filed: Oct. 12, 1995

[51] Int. Cl.⁶ .................................................. A01K 1/10
[52] U.S. Cl. .................... 119/419; 119/416; 119/454; 119/464; 119/475; 119/477; 119/51.5
[58] Field of Search ............................ 119/416–419, 454, 119/456, 464, 475, 477, 500, 51.01, 51.5

[56] References Cited

U.S. PATENT DOCUMENTS

| | | |
|---|---|---|
| 3,853,096 | 12/1974 | Whitty ..................................... 119/475 |
| 3,951,105 | 4/1976 | Mehn ..................................... 119/475 |
| 4,480,587 | 11/1984 | Sedlacek . | |
| 4,640,228 | 2/1987 | Sedlacek et al. . | |

FOREIGN PATENT DOCUMENTS

240410  6/1946  Switzerland ......................... 119/51.5

Primary Examiner—John G. Weiss
Assistant Examiner—Dennis Ruhl
Attorney, Agent, or Firm—Strook & Strook & Lavan LLP

[57] ABSTRACT

A combination food and liquid dispenser for an animal cage including a first compartment and a second compartment being in vertical relation to each other. The second compartment is constructed to receive food therein and provide an animal access to the food item disposed therein and the first compartment is constructed to receive a liquid container therein and provide an animal with access to the liquid container disposed in the first compartment. A bracket assembly is affixed to the dispenser and supports the dispenser within the cage on less than four side walls thereof. A filter cap for the animal cage includes a body portion dimensioned to fit upon and cover over the top of the cage. Disposed in the interior of the body portion is an air filter, a retainer for retaining the air filter in close proximity to a top wall of said body portion, a protective cover for protecting the integrity of the air filter and the retainer, and a lock for releasably securing the air filter, the retainer and the protective cover within the interior region of the body portion.

18 Claims, 9 Drawing Sheets

FIG. 15

ANIMAL CAGE ASSEMBLY AND COMBINATION WATER BOTTLE HOLDER AND FEEDER

BACKGROUND OF THE INVENTION

The present invention relates to caging systems for housing and isolating laboratory animals including food and water feeders to feed such animals and, in particular, to an improved food and water dispenser that can be supported by an edge of the case and an improved cage assembly that can be used therewith.

In the production of colonies of rats, mice or other small laboratory animals by breeding, the mice are housed in animal cages which are arranged in close proximity within confined areas. The colonies are subject to airborne diseases which spread rapidly from one cage to another, particularly where the surrounding environment is not particularly sanitary. It is particularly desirable to maintain a closed, limited defined flora colony, that is, a colony of mice having a limited number of bacteria which are constantly the same. This is also the manner in which animals are maintained during laboratory experimental work to maintain the animals free of outside contaminants.

Conventional animal cages for maintaining animals in a reduced contamination environment are described in U.S. Pat. Nos. 4,480,587 and 4,640,228. These latter type of "shoebox" transparent cage bodies employ a detachable air filter which extends across the entire top of the lid and a retainer member which retains the filter thereagainst. However, and as particularly described in U.S. Pat. No. 4,640,228, these conventional cages employ a wire bar lid feeding and water dispenser to minimize the number of times the cage must be opened. The wire bar lid essentially consists of a stainless steel bar construction having an outer rim which is supported along the entire lip of the cage. A plurality of bars extend across the rim. The lid extends deep within the cage interior for easy access by the animal disposed therein. Within this lid is placed the food items and a water bottle. By providing a lid made of stainless steel or some other metal, the filter and plastic lid are protected from the animal.

However, this type of feeding and watering structure has been less than satisfactory for the following reasons. First, the downwardly sloping surface of the structure typically extends deep within the middle of the cage assembly. Accordingly, it has been found that larger laboratory animals have great difficulty in moving about the cage since the lid extends substantially within the cage interior. Accordingly, as the laboratory animal increases in size, the area within the cage assembly that the laboratory animal is able to move is severely diminished. Secondly, the aforementioned cage construction requires a handler to physically remove the feeding dispenser in order to gain access to the interior of the cage and laboratory animal contained therein. Thirdly, the aforementioned structure limits the visibility of the laboratory animal contained in the cage. When viewing the laboratory animal from the top, the additional opaqueness of the water bottle and food items further hinders the view of the laboratory animal. When viewing an animal from a cage end, the food carrying portion of the lid blocks the view of animals positioned at the opposite end of the cage.

Accordingly, it is desired to provide an improved water bottle holder and feeder construction that permits increased mobility of the laboratory animal contained within the cage assembly and improve visibility of the laboratory animal contained therein. It is also desired to provide an improved cage construction that protects the integrity of the reusable filter once protected by the aforementioned lid construction. The invention disclosed herein provides a wire bar cover in the body portion and provides for such an improved cage assembly construction.

SUMMARY OF THE INVENTION

Generally speaking, in accordance with the present invention, a combination food and liquid dispenser for an animal cage is provided. The dispenser, which may be formed of a plurality of wire bars, includes a first compartment in vertical relation to a second compartment and may include a separator for separating the two compartments. The separator may be formed from a plurality of the wire bars which form a bottom of the water compartment. The first compartment is constructed to receive a liquid dispenser therein and provide an animal with access to liquid in the liquid dispenser when disposed in the first compartment and the second compartment is constructed to hold food and provide an animal access thereto.

The dispenser may also include a bracket assembly to permit the dispenser to be supported on one side or lip of the cage in which the dispenser is placed.

In another aspect of the invention, a filter cap for an animal cage is provided. The filter cap includes a body portion dimensioned to fit upon and cover over the top of the cage. The filter cap has a top wall, a side wall, and end walls which define an interior region therein. The filter cap constructed in accordance with the present invention includes an air filter disposed in the interior of the body portion which extends across the top wall of the body portion, a retainer member disposed in the interior of the body portion for retaining the air filter against or at least in close proximity to the top wall of the body portion, a protective cover for preventing access to the air filter by animals within the cage and a securing assembly for releasably securing the air filter, the retainer member and the protective cover within the interior region of the body portion.

Lastly, a cage assembly for housing an animal is provided. The cage assembly includes a cage portion having a bottom and integral side walls. A filter cap including a body portion is dimensioned to fit upon and cover over the cage portion. The filter cap includes a top wall and side and end walls defining an interior region of the body portion. An air filter, disposed in the interior of the body portion, extends across at least a substantial portion of the top wall of the body portion. A retainer, disposed in the interior of the body portion, retains the air filter at least in close proximity to the top wall of the body portion. A protective cover, disposed in the interior region of the body portion, protects the integrity of the air filter and the retainer. A lock releasably secures the air filter, the retainer and the protective cover within the interior of the body portion. Also included in the cage assembly is a food and liquid dispenser that includes a first compartment constructed to receive a liquid container and a second compartment constructed to receive a food item, the two compartments being in adjacent relation, and a bracket assembly affixed to the dispenser for supporting the dispenser on a wall of the cage portion.

Accordingly, it is an object of the present invention to provide an improved cage assembly for housing and isolating laboratory animals.

A further object of the present invention is to provide an improved cage assembly that provides an animal housed therein with an increased area within which to freely move.

Yet a further object of the present invention is to provide a cage assembly that enables the animal housed within the cage assembly to be more easily viewed.

Still another object of the present invention is to provide a combination food and water dispenser that provides the animal housed therein with increased room within which to move about while further increasing the ability to view the animal within the cage assembly while protecting the integrity of the cage filter.

A still further object of the present invention is to provide a cage assembly which eliminates the need to physically remove the water and feeding dispenser in order to gain access to the interior of the cage and laboratory animal housed therein.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
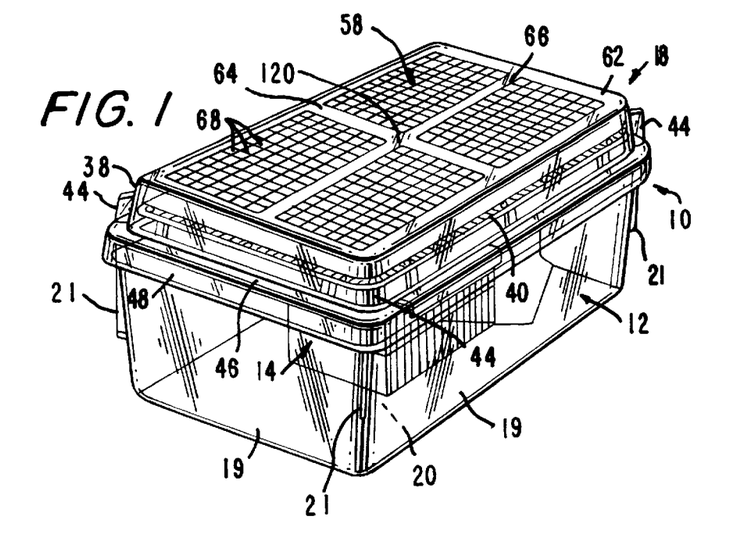
FIG. 1 is a perspective view of an animal cage assembly in accordance with the present invention.
Figure 2:
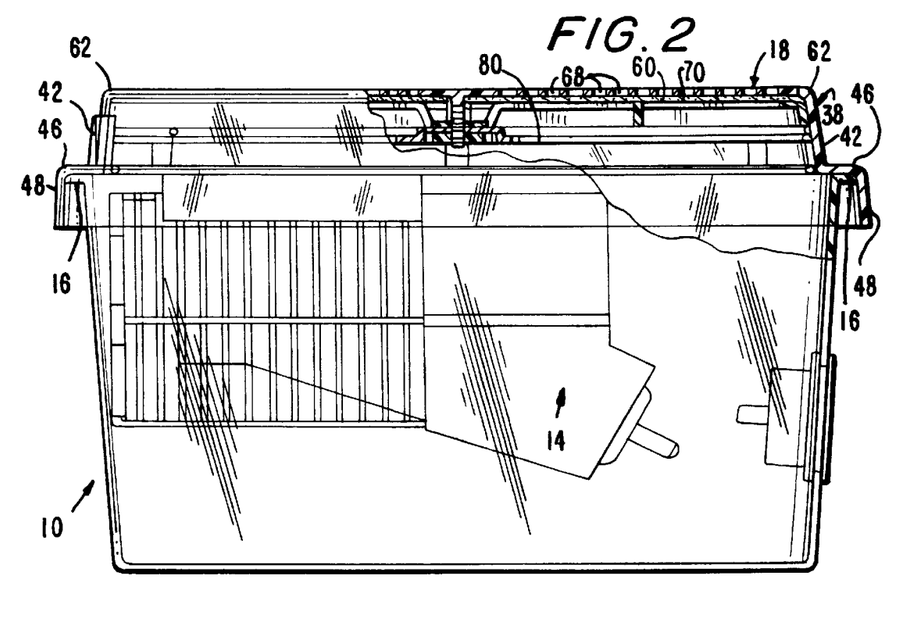
FIG. 2 is a side elevational view of the animal cage assembly of FIG. 1, with a portion thereof shown in cross-section.
Figure 3:
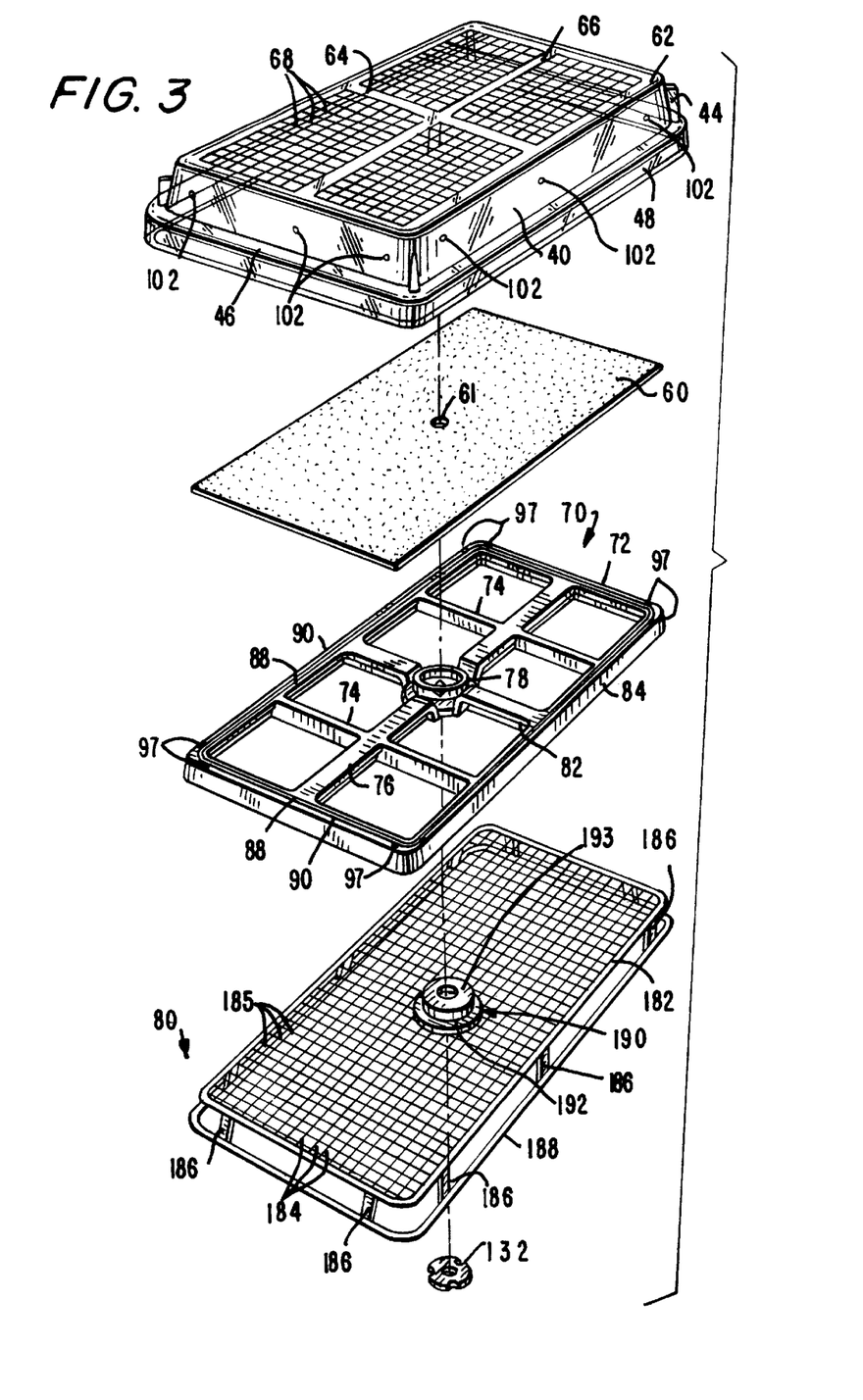
FIG. 3 is an exploded perspective view of a filter cap assembly constructed in accordance with the present invention.

Referring in general to the drawings, and FIGS. 1–3 in particular, a cage assembly incorporating a reusable filter and containing a combination liquid and food dispenser, constructed in accordance with the present invention, is generally indicated as 10. Cage assembly 10 comprises a box-like animal cage 12 with a combination liquid and food dispenser, generally indicated at 14 ("dispenser 14"), located within cage 12.

Cage 12 is formed with integral side walls 19, a bottom wall or floor 20 and an open top end. The walls are preferably formed of a clear transparent plastic such as polycarbonate, which is rigid, durable, permits ready inspection of animals, has a high impact strength, and is machine washable or autoclavable at temperatures under 250 degrees Fahrenheit. Such a cage is conventional, commercially available, and widely used. A standard absorbent bedding of particulate material such as wood chips (not shown) may be spread on floor 20 (FIG. 2) of cage 12. The open top of cage 12 is bordered by peripheral lip 16 which extends continuously therearound. Cage 12 may also include corner reinforcements 21 for added structural support.

A filter cap, generally indicated as 18, comprises a body portion 38 in the general shape of a deep tray or box. Body portion 38 is preferably formed of clear plastic such as polycarbonate having the properties previously described for cage 12. Body portion 38 includes respective opposed side walls 40 and end walls 42 and may include corner reinforcements 44 at the respective intersections of walls 40 and 42 for additional structural support. The surface formed on body portion 38 for resting filter cap 18 on cage 12 includes a continuous lateral peripheral flange 46 extending perpendicularly outwardly from walls 40 and 42. A continuous peripheral flange 48 depends from lateral peripheral flange 46 to encompass cage 12.

As shown in FIG. 2, flange 48 is spaced from, encompasses and overhangs lip 16 of cage 12. Thus, filter cap body portion 38 cannot be inadvertently dislodged from cage 12 and must be lifted off to be removed. It should also be noted that the clearance space between flange 48 and lip 16 should permit only a slight movement of filter cap 18 on cage 12. However, peripheral flange 46 is of sufficient lateral extent to remain in contact with lip 16 despite any relative lateral movement between filter cap 18 and cage 12, thereby maintaining the integrity of the seal between filter cap 18 and cage 12.

As shown in FIGS. 1 and 3, filter cap 18 has a perforated top wall 58 which is integrally molded with filter cap body portion 38 to provide a marginal narrow ledge or flange 62 which extends continuously around the top of filter cap 18 and borders perforated top wall 58. Central narrow cross arms 64 and 66 are molded integrally with ledge 62 and intersect, dividing top wall 58 into four rectangular sections. These rectangular sections are each provided with a plurality of perforations 68 of square configuration and forming a grid array.

Figure 9:
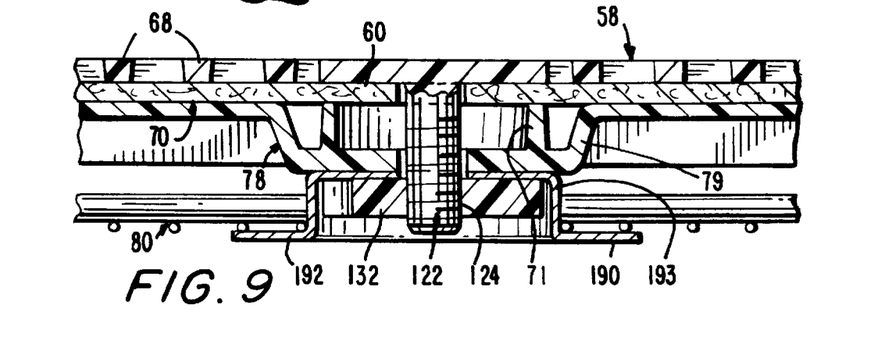
FIG. 9 is an enlarged sectional view through the central portion of an assembled filter cap constructed in accordance with the present invention.

As illustrated in FIGS. 3 and 9 and discussed in greater detail below, cross arms 64 and 66 of top wall 58 intersect at a central portion 120. Depending from top wall 58, on an underside surface thereof at essentially central portion 120 is an integral depending cylindrical post 122 having an external threading 124. Filter cap 18 is also provided with a retainer member 70. Retainer member 70 detachably securely maintains an air filter 60 to an underside surface of top wall 58. A wire bar cover 80 is provided and secured to the underside of filter cap 18 and against retainer member 70 by a lock nut 132 which may be releasably threaded onto post 122. Wire bar cover 80 also assists in protecting the integrity of air filter 60 and retainer member 70 as further described below.

In a preferred embodiment, air filter 60 is a thin sheet of spun-bonded polyester of the type sold by DuPont under the trademark REEMAY 20–24. A filter thickness of between 11 and 13 mils has been found adequate for a filter having an area approximately equivalent to the area of filter cap top wall 58. An aperture 61 is provided in the center of air filter 60 and is dimensioned to receive cylindrical post 122 therethrough. Air filter 60 is mounted on the underside of filter cap body portion 38 and is held in place by retainer member 70 in a manner to be herein now described. REEMAY 20–24 is used by way of example and any filter medium having at least its properties may be utilized.

Retainer member 70, shown in detail in FIGS. 3 and 7–9, comprises a narrow border portion 72 which is generally rectangular, and flat cross arms 74 and 76 which are molded integrally with border portion 72. The center cross arm 74 and cross arm 76 intersect at an integral circular central portion 78. Central portion 78 is recessed a short distance below the plane of cross arms 74 and 76 by integral angled arm extensions 79. An aperture 77, dimensioned to receive cylindrical post 122, is provided in the center of central portion 78. To provide support to the middle of air filter 60 against the bottom surface top wall 58, central portion 78 includes an integral rim 71 which contacts air filter 60 when secured thereagainst.

Figure 5:
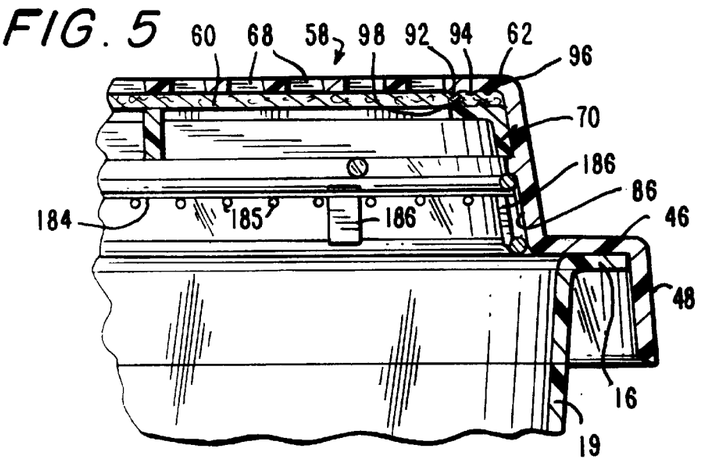
FIG. 5 is an enlarged fragmentary sectional view of one end of the filter cap of the cage assembly of FIG. 1 with the components of the filter cap illustrated in an assembled state.
Figure 6:
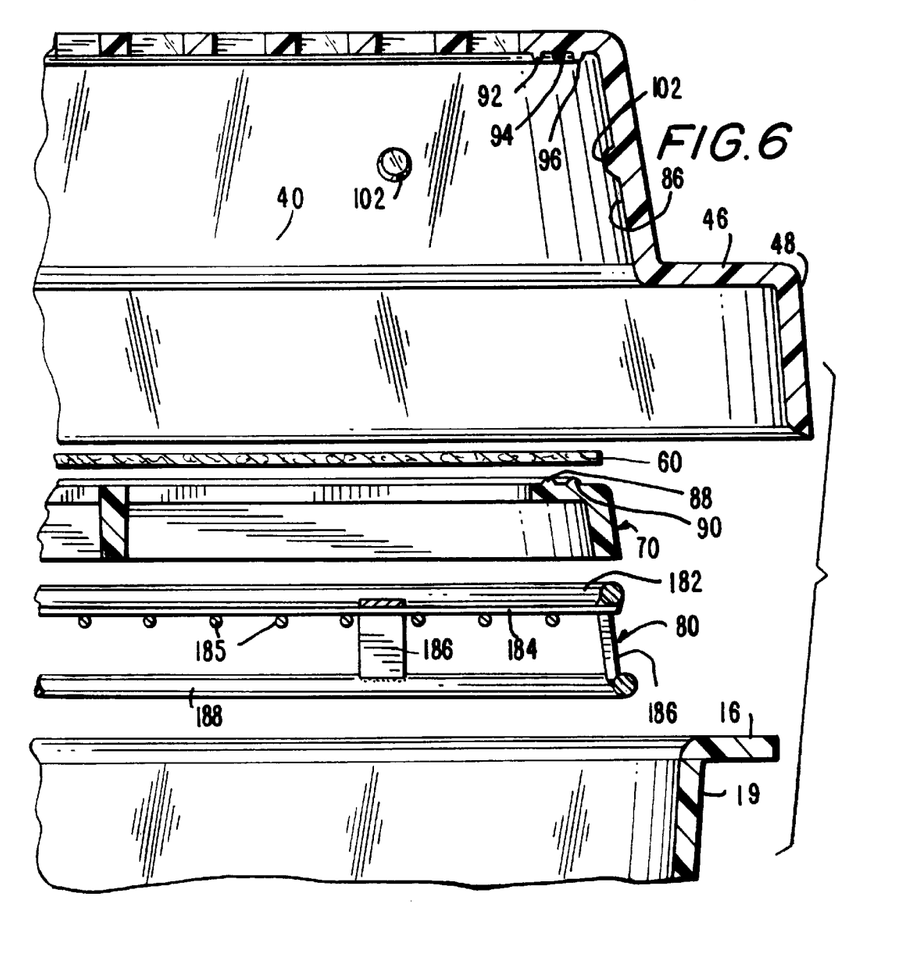
FIG. 6 is an enlarged exploded sectional view of the filter cap illustrated in FIG. 5.
Figures 7, 8:
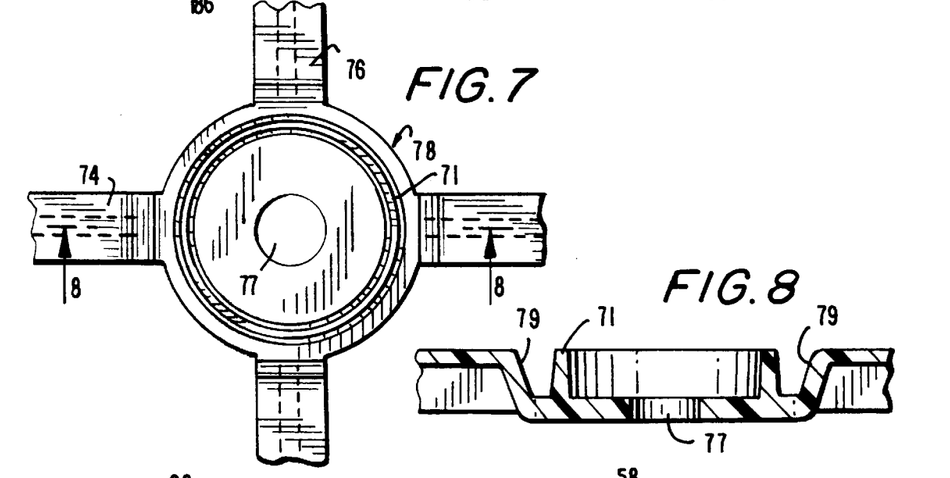
FIG. 7 is an enlarged fragmentary top plan view of the central portion of the retainer member illustrated in FIG. 3.
FIG. 8 is a sectional view taken along lines 8—8 of FIG. 7.

An outer edge 82 of border portion 72 is joined to an integrally molded peripheral flange 84 which depends therefrom and extends continuously around border portion 72, and which closely fits an inner surface 86 of filter cap body portion 38, as shown in FIGS. 5–6. The top surface of border portion 72 is formed with a pair of spaced-apart integrally molded ribs 88, 90 which extend continuously therearound. Each rib 88, 90 has a generally convex cross-section as shown in FIG. 6, and the ribs are disposed to project between a group of three similarly-shaped spaced-apart ribs 92, 94 and 96, which are integrally molded on a bottom surface 98 of filter cap ledge 62.

Figure 4:
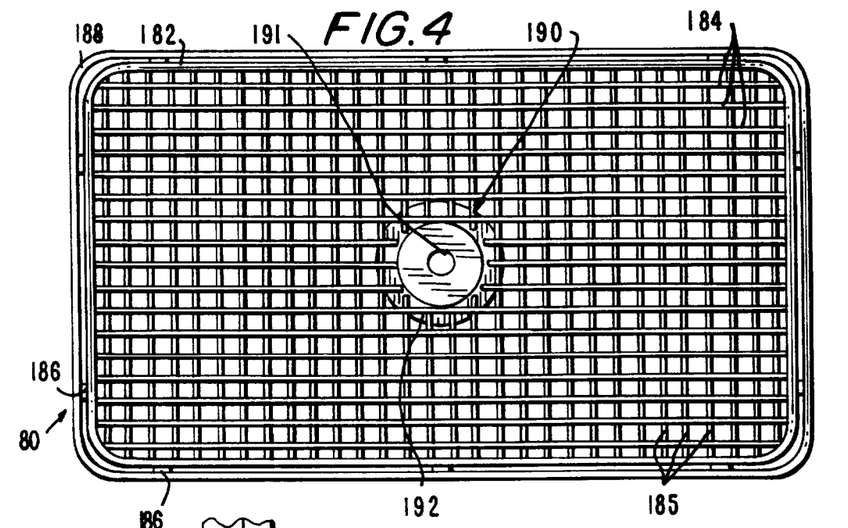
FIG. 4 is a top plan view of the wire bar protective cover constructed in accordance with the present invention.

Reference is now made to FIG. 3–4, which illustrate in detail a wire bar cover, generally indicated as 80. Wire bar cover 80 includes a first frame 182, preferably made from stainless steel wire. A plurality of horizontal wire bars 184 are affixed to a plurality of overlying vertical wire bars 185 to form a wire bar grid array. The outer edges of each wire bar 184 and 185 are affixed to first frame 182. Spacer members 186 are provided and are affixed to first frame 182 at a plurality of locations therearound. A second frame 188, spaced apart from first frame 182, and having a slightly larger circumference than first frame 182 is affixed to spacer members 186 at the ends thereof opposite the ends affixed to first frame 182. Spacer members 186 are slightly angled so as to join first frame 182 and second frame 188 as well as to interference fit against inner surface 86 of body portion 38, as discussed below. A cap 190, preferably made of metal, is provided essentially at the center of wire bar cover 80. Cap 190, which includes an aperture 191 to receive threaded post 122, also includes a brim 192 which is affixed to the ends of wire bars 184 and 185 essentially at the ends thereof. Integral with and extending orthogonally from brim 192 is a lid portion 193 which receives thereagainst the bottom surface of central portion 78 of retainer member 70. Lip portion 193 extends below the plane of the wire bar grid array formed by overlapping wire bars 184 and 185 so as to lie flush against the bottom surface of central portion 78. The underside of lid portion 193 receives nut 132 therein.

To assemble filter cap 18, air filter 60 is placed against the lower surface of top wall 58 with threaded post 122 extending through aperture 61 of air filter 60. Thereafter, retainer member 70 is inserted into the interior of filter cap 18 so that threaded post 122 extends through aperture 77 and rim 71 of retainer member 70 presses into flush abutment against filter 60. Ribs 88, 90, 92, 94 and 96 interlock such that rib 88 projects between ribs 92 and 94, while rib 90 projects between ribs 94 and 96, as shown in FIG. 5. Ribs 88, 90, 92, 94 and 96 thus also serve to hold filter 60 securely in place against the bottom surface 98 of ledge 62. In addition, a plurality of recesses 95, molded on the underside surface of top wall 58, may be provided and receive a plurality of dimples 97, which may be molded on the top surface of border portion 72 and correspondingly aligned with recesses 95. The portions of air filter 60 positioned between recesses 95 and corresponding dimples 97 are trapped therebetween. In this way, air filter 60 is further securely held in place. Furthermore, the top surfaces of flat cross arms 74 and 76 still further serve to prevent air filter 60 from sagging and hold air filter 60 securely in place against the bottom surface of top wall 58.

Retainer member 70 is held in place by means of small projections 102 which are integrally molded on inner surface 86 of filter cap body portion 38. As shown in FIG. 3, three spaced projections 102 are molded on each side wall 40 of body portion 38 and three spaced projections 102 are molded on each end wall 42. Each of the projections 102 has a convex or arcuate free end, as shown in FIG. 6.

Projections 102 are precisely molded on body portion 38 and are spaced from bottom surface 98 of filter cap ledge 62 by a distance slightly greater than the height of integral peripheral flange 84 of the retainer member 70. After air filter 60 has been positioned against the lower surface of top wall 58, retainer member 70 is moved upwardly within filter cap body portion 38 toward the perforated top wall 58 thereof to permit depending flange 84 of retainer member 70 to engage projections 102. Retainer member 70 flexes inwardly so that depending flange 84 snaps past projections 102 to the mounted position shown in FIG. 5. In this mounted position, the bottom edge of flange 84 rests upon the top surface of projections 102 and is supported thereby, with ribs 88 and 90 on the top surface of border portion 72 engaging the bottom surface of the edge portion of air filter 60 and pressing this filter portion against ribs 92, 94 and 96 of filter cap ledge 62. At the same time, cross arms 74, 76 of retainer member 70 engage the bottom surface of air filter 60 and press filter 60 firmly against the bottom surface of top wall 58. Air filter 60 is thus sandwiched between retainer member 70 and the bottom surface of top wall 58 of filter cap body portion 38, and may be retained in this mounted position by the engagement of projections 102 upon flange 84 of retainer member 70.

Wire bar cover 80 is then moved upwardly within filter cap body portion 38 toward the underside surface of retainer member 70. Wire bar cover 80 is aligned to permit threaded post 122 to extend through aperture 191 of cap 190 so that the top surface of lid portion 193 lies flush against the bottom surface of central portion 78 of retainer member 70. The length of spacer members 186 permit second frame 188 to rest against and be in part supported by the surface of outwardly extending peripheral flange 46. By positioning wire bar cover 80 over retainer member 70, air filter 60 is yet further protected from animal contact and damage thereto. Furthermore, retainer member 70 is protected by wire bar cover 80 from gnawing animals such as rats. Nut 132 is screwed upon threaded post 122 and turned until it engages the lower surface of lid portion 193 of cap 190. Continued turning of nut 132 forces the top surface of lid portion 193 of cap 190 against the bottom surface of circular portion 78 of retainer member 70 so that second frame 188 lies at least essentially entirely flush against and is supported by peripheral flange 46 of body portion 38. In addition, the continued turning of nut 132 forces rim 71 upwardly so that it presses the central portion of filter 60 firmly against the central circular portion 120 of the bottom surface of top wall 58. Wire bar 80, retainer member 70 and air filter 60 are thus firmly locked in a mounted position so that they cannot be accidentally dislodged during autoclaving or handling. An assembled filter cap 18 can thus be lifted and removed from animal cage 12 for all normal functions such as feeding, treating or examining the animals, without disturbing or dislodging air filter 60. Furthermore, the protective wire cover can be autoclaved with the filter cap and retainer member as a unit.

When it becomes necessary to replace or remove filter 60, nut 132 is first removed from cylindrical post 122 so that wire bar cover 80 can easily slide off of post 122 and be removed therefrom. Thereafter, to remove retainer member 70 from filter cap 18, one must merely grasp central portion 78 of retainer member 70 and pull retainer member 70 away from top wall 58 of filter cap body portion 38. In this way, retainer member flange 84 will snap over projections 102, releasing retainer member 70 which can then be lifted out of filter cap 18 to expose air filter 60. Filter 60 is then grasped and lifted over cylindrical post 122 for removal and replacement. Once a new filter 60 is replaced and inserted over cylindrical post 122 as described above, retainer member 70 is then replaced and snapped into its mounted position to support the new filter. Wire bar cover 80 is then mounted on cylindrical post 122 and securely tightened by nut 132 as described above. In this way, filter 60 can be changed with a minimum amount of time and effort, thereby minimizing the exposure of the animals to an unfiltered environment while filter cap 18 is removed from the animal cage.

In the assembled filter cap 18, perforated top wall 58 overlies filter 60 to protect the filter against damage during handling and prevent its buckling, while filter 60 rests flush upon border portion 72 and cross arms 74, 76 of retainer member 70 which support air filter 60 in its mounted position and against the central portion of the lower surface of top wall 58.

Figure 10:
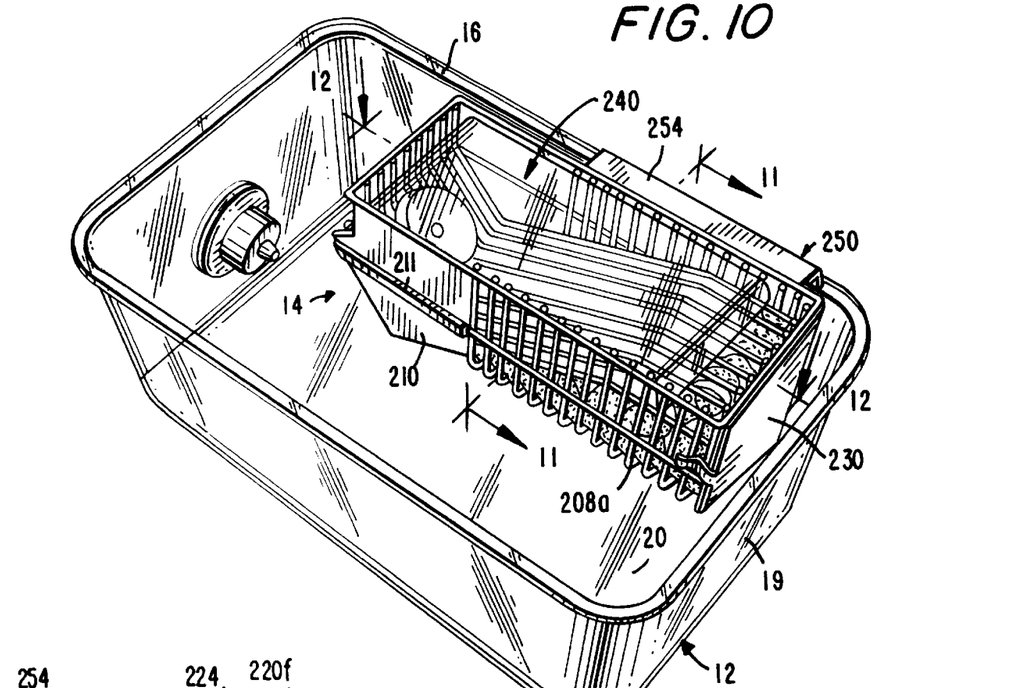
FIG. 10 is a perspective view of the animal cage assembly with the filter cap removed and illustrating the combination liquid and food dispenser mounted on a side wall of the cage assembly bottom and constructed in accordance with the present invention.
Figure 11:
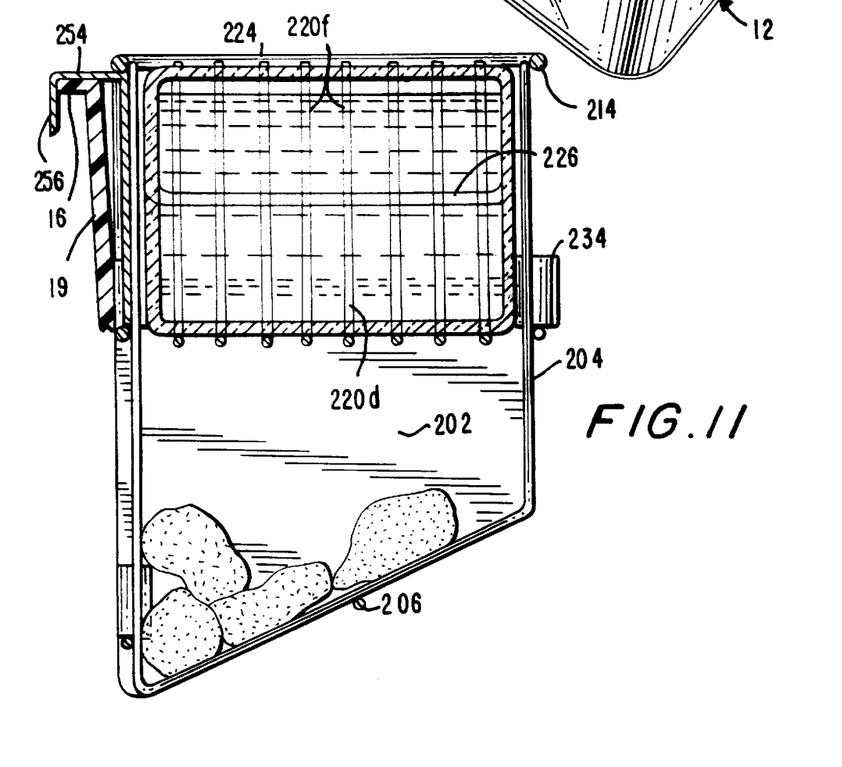
FIG. 11 a cross-sectional view taken along lines 11—11 of FIG. 10.
Figure 12:
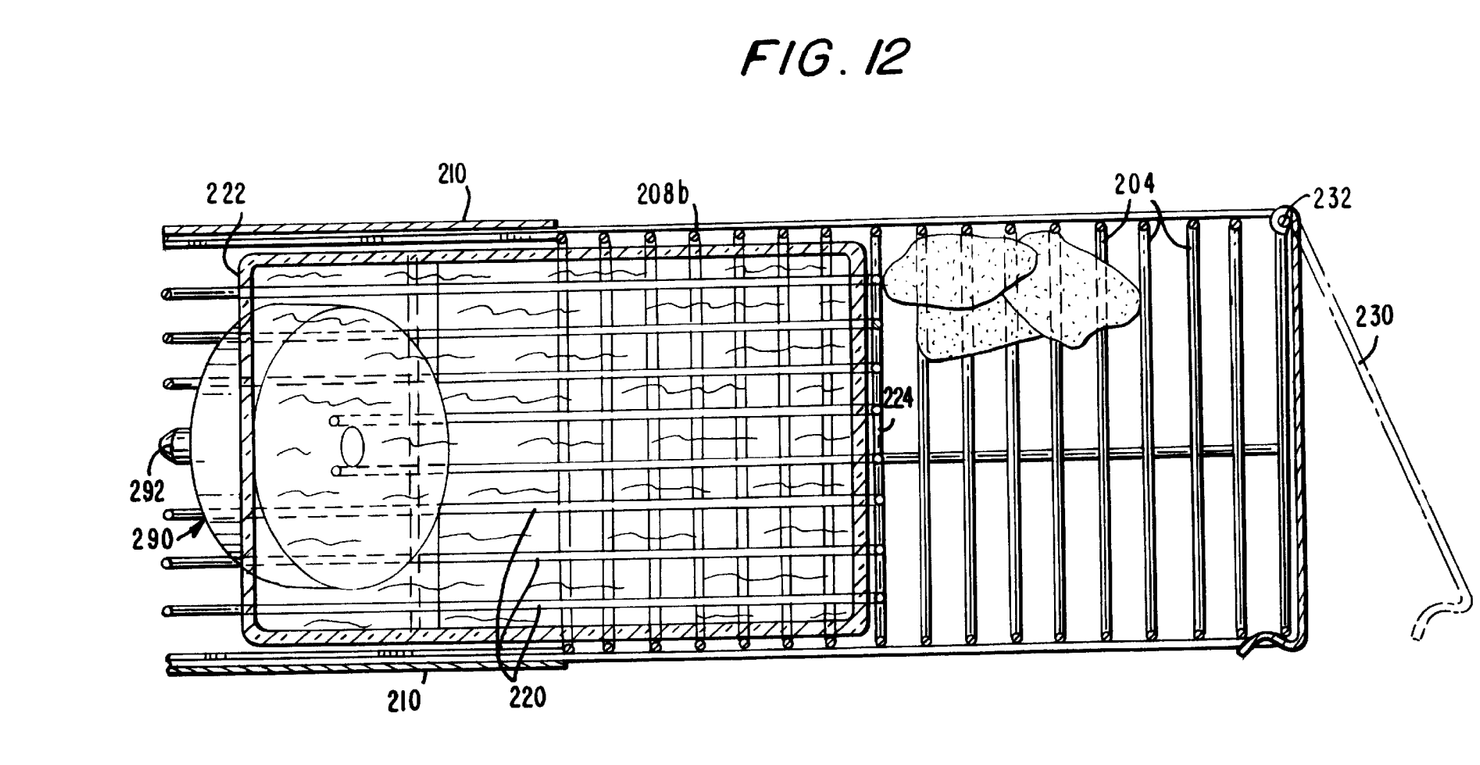
FIG. 12 is a top plan view of an alternative embodiment of the combination food and liquid dispenser constructed in accordance with the present invention.
Figure 13:
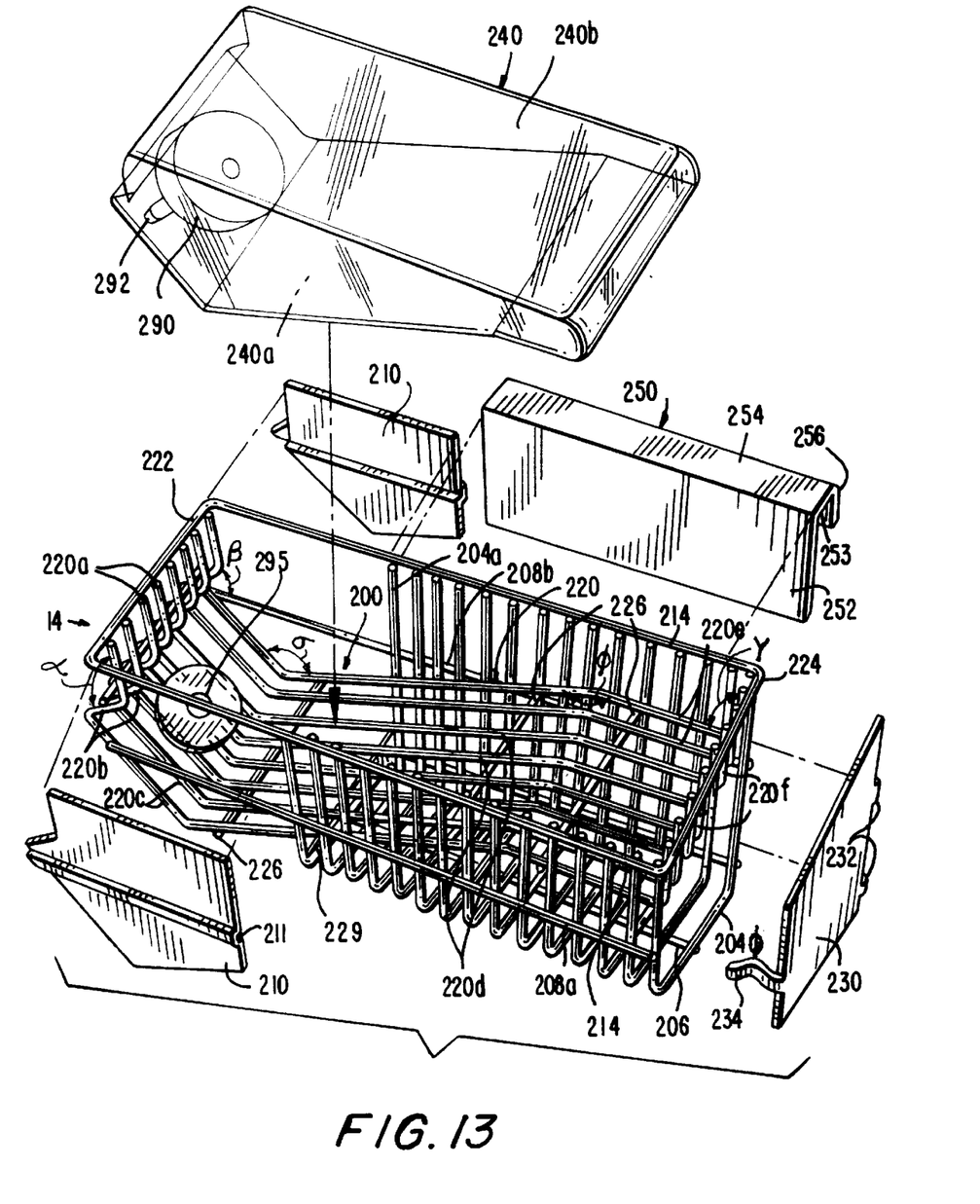
FIG. 13 is an exploded perspective view of the combination liquid and food dispenser constructed in accordance with the present invention and further illustrating a liquid dispenser constructed to be used with the dispenser constructed in accordance with the present invention.

Reference is now made to FIGS. 10–13 which illustrate a first embodiment of a liquid and food dispenser constructed in accordance with the present invention. As illustrated in FIGS. 10, 11 and 13, a liquid and food dispenser 14 ("dispenser 14") constructed in accordance with the first embodiment is illustrated as being mounted in cage 12. Dispenser 14 includes a liquid compartment, generally indicated at 200, and a food compartment, generally indicated at 202, positioned in vertical relation to each other when viewed in a mounted position within cage 12. However, it is also understood that water compartment 200 and food compartment 202 may also be in horizontal relation to each other and separated by a wire bar wall, for example. Dispenser 14 includes a frame 214. A plurality of spaced apart essentially U-shaped wire bars 204 depend from frame 214 along a portion of its length and form a portion of the outer walls of dispenser 14. Wire bars 204 may also be asymmetrical as particularly illustrated in FIG. 11. Wire bars 208a, 208b are affixed to a respective arm of each U-shaped bar 204 substantially parallel to frame 214. U-shaped bars 204 form a food carrying portion of food compartment 202. A bottom wire bar 206 is affixed to each wire bar 204 at the underside of dispenser 14 to provide support and maintain the shape and integrity of dispenser 14. Side wire bars 208a, 208b are provided on each side of dispenser 14. Similarly, each side wire bar 208a, 208b and bottom wire bar 206 are preferably spot welded to U-shaped wire bars 204 to ensure that side wire bars 208a, 208b and bottom wire bar 206 remain secured to U-shaped wire bars 204 and provide support thereto. As illustrated in FIG. 13, side wire bars 208a, 208b may extend past U-shaped wire bar 204a so as to receive and support side plates 210 as further discussed below. The number and spacing of the wire bars forming food compartment 200 act to limit the amount of access to the food. Preferably, U-shaped wire bars 204, as well as edge, bottom and side wire bars 214, 206, 208a and 208b are made from stainless steel, wire although other material may be selected without following outside of the scope of the invention.

A back panel 230 includes hinges 232. A clip 234 may be integral with or welded on back panel 230. Back panel 230 may be hingedly mounted to the rearmost wire bar 204 (204φ) by hinges 232. Clip 234 is preferably biased against the corresponding opposite arm of U-shaped wire bar 204φ. The releasable nature of clip 234 allows back panel 230 to releasably open and close to permit access to the interior of food compartment 202.

Reference is now made to FIG. 13 which illustrates water compartment 200 in greater detail. Water compartment 200 may be comprised of a plurality of wire bars 220. Each wire bar 220 is preferably comprised of integral sections 220a–f. Wire bar section 220a is affixed to frame 214 at an end 222 thereof and depends from the plane formed by frame 214. In a preferred embodiment wire bar section 220b is preferably bent with respect to wire bar section 220a at an angle α. Wire bar sections 220b and 220c are integral with and bent towards each other at an angle β to form a water bottle abutment for receiving and supporting a water bottle at a position accessible to animals within the cage. Wire bar sections 220c and 220d are similarly integral with each other and bent towards each other at angle σ. Wire bar sections 220d and 220e are integral with and bent towards each other at an angle φ to form a support surface to support the water bottle thereon. Wire bar sections 220e and 220f are similarly integral with each other and bent towards each other at angle Y. Wire bar section 220f is secured to a second end portion 224 of frame 214. In a preferred embodiment, wire bar sections 220a and 220f are spot welded to frame 214. The shape of bars 220 is provided by way of example. The external shape of dispenser 14 may be any shape which allows access to food and water contained therein.

Support bars 226 may also be provided across wire bar section 220b, 220d and 220e, for example, to provide additional support for water bottle 240 and structural integrity for dispenser 14. Outermost wire bars 220 may be affixed to U-shaped wire bars 204 to ensure that water compartment 200 remains connected to food compartment 202 to form dispenser 14. A thin metal plate 229 may also be affixed to wire bar section 202a and/or wire bar section 220d so as to prevent food items from inadvertently or undesirably escaping between wire bar respective sections 220a and the plurality of wire bar sections 220d.

Wire bars 220 also act as a roof to food compartment 202 preventing unlimited access to the food by the animals when no watering bottle is present such as when the cage is utilized in a cage and rack system having water delivered to the cage by the rack.

Side plates 210, typically made of thin metal, include a convex channel 211 running the length thereof and receive the respective side wire bar 208a, 208b portion extending beyond U-shaped wire bars 204a. Side plates 210 provide a partial side enclosure for water compartment 200 and may be affixed along selected spots of the respective side wire bars 208a, 208b and frame 214 which also extend beyond U-shaped wire bar 204a. Plates 210 are preferably spot welded to frame 214 and wire bars 208a, 208b. As particularly illustrated in FIG. 13, a valve guide plate 294 may be provided and secured to one or more wire bars 220 of wire bar section 220c, by welding or the like, to assist in guiding and positioning a sip tube 292 to the animal.

Reference is now made to FIGS. 10, 11 and 13 which illustrate in detail a bracket assembly, generally indicated at 250, constructed to permit the mounting of dispenser 14 on side wall 19 of cage 12. Bracket assembly 250 includes a back plate 252, a continuous lateral peripheral flange 254 extending outwardly from back plate 252 and a continuous peripheral flange 256 depending in a direction from lateral peripheral flange 254 to form a gap 253 between plate 252 and flange 256. Back plate 252 can be secured to U-shaped wire bars 204 by spot welding thereto. As shown in FIG. 11, gap 253 receives a portion of lip 16 of cage 12. Thus, once dispenser 14 is secured to bracket assembly 250, dispenser 14 cannot be inadvertently dislodged from the side of cage 12 without lifting filter cap 18 off of cage 12. In this way, safety is provided to the animal by preventing the possibility that the animal could inadvertently be crushed by the movement of the dispenser. Furthermore, although side wall mounting is illustrated in this embodiment, flanges 254 and 256 can be utilized to hang dispenser 14 on any upstanding wall of a cage.

A water bottle 240 for use with dispenser 14 is molded from conventional FDA approved materials such as glass, and shaped so as to conform to the shape of water compartment 200. Specifically, the bottom surface 240a of water bottle 240 is sloped so as to conform to the surface formed by wire bar sections 220d and 220e. A top surface 240b of water bottle 240 should also extend no further than edge wire bars 214 if a lid, if desired, is to be releasably closed thereover or to prevent the water bottle from interfering with the fit of cap 18. A conventional rubber stopper 290 and sip tube 292 are provided on water bottle 240 so as to provide water to the animal disposed within cage 12. Sip tube 292 extends through an aperture 295 in plate 294. This shape is preferred for water bottle 240, however, any shape which can be supported by wire bars 220 and extend a sip tube through bars 220 or aperture 295 can be accommodated by water compartment 200.

The downwardly sloping (when viewed from the rear of dispenser 14 nearer U-shaped wire bar 204ϕ towards the front of dispenser 14 nearer wire bar sections 220a) wire bar section 220d facilitates the flow of water through sip tube 292 by providing a horizontal gravitational force component to act on the water disposed in correspondingly shaped water bottle 240.

Figure 14:
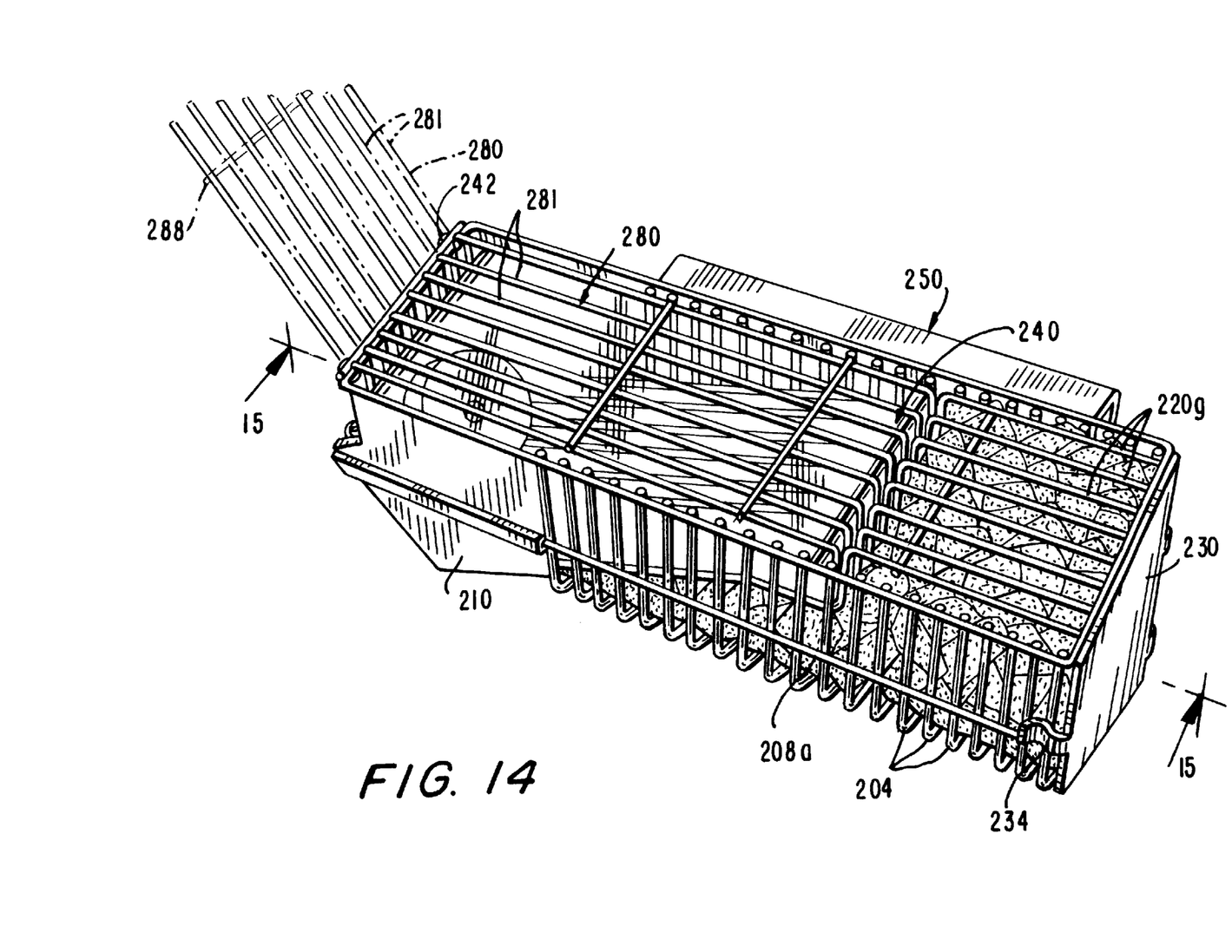
FIG. 14 is a perspective view of the combination liquid and food dispenser constructed in accordance with another embodiment of the invention.
Figure 15:
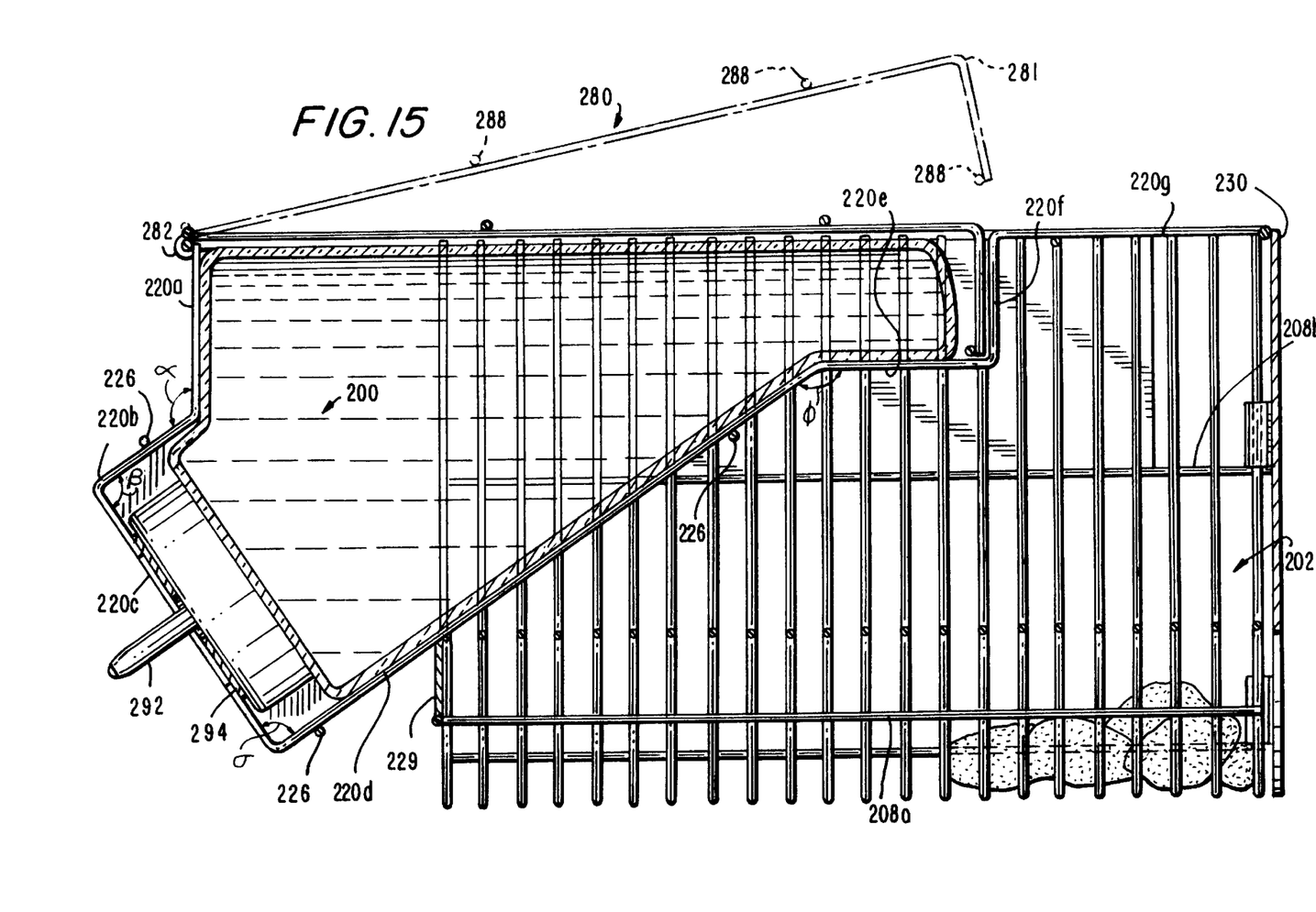
FIG. 15 is a cross-sectional view taken along lines 15—15 of FIG. 14.

Reference is now made to FIG. 12, 14 and 15 which illustrate a dispenser, generally indicated at 14', constructed in accordance with a second embodiment of the present invention. Like parts to those identified in FIGS. 10, 11 and 13 are referred to with like reference numerals, the primary difference being a protective lid for water compartment 200.

In general, a concern of laboratory animal handlers is the mobility and agility of rats as compared to mice, which may disturb the water bottle resting in water compartment 200. Accordingly, dispenser 14' may also include a protective lid, generally indicated at 280, constructed from a plurality of L-shaped wire bars 281 extending the length of water compartment 200 to cover water compartment 200. Lid 280 may be hingedly connected to end wire bar 222 with hinges 282 affixed at one end of each of L-shaped bars 281. Similarly, lid 280 may be provided with a plurality of support bars 288 which assist in maintaining the structure of lid 280. Protective lid 280 helps ensure that certain animals, such as rats, do not climb about dispenser 14' and damage the water bottle disposed in water compartment 200.

In addition, dispenser 14' may be extended to include a longer food compartment 202' than that of dispenser 14. That is, food compartment 202' extends beyond wire bar section 220f and further includes a wire bar section 220g integral with wire bar section 220f and essentially orthogonal thereto. Wire bar section 220g provides for an enclosed food compartment 202'. In all other respects, dispenser 14' is similar to dispenser 14.

In use, food is placed within food compartment 202 by opening back panel 230 and placing the food items therein. Similarly, water bottle 240 is filled and placed within water compartment 200. Lid 280, if provided, may then be closed so as to cover water compartment 200 and enclose water bottle 240.

In use of cage assembly 10 the floor of cage 12 is covered with bedding material (not shown). Dispenser 14 is then positioned on cage lip 16 of cage side wall 19 as shown in FIG. 11. Food and water are provided in the respective food and water compartments 202 and 200. Filter cap 18 is then positioned on cage 12 in the manner shown in FIGS. 1 and 2, and remains securely in place until lifted off. In the mounted position of filter cap 18, lateral peripheral flange 46 rests upon lateral peripheral flange 254 of bracket assembly 250, which in turn is resting upon lip 16, to cooperate with overhanging flange 48 to provide an effective contamination barrier for the interior of the cage assembly. If dispenser 14 is not included in the cage assembly, flange 46 would rest directly upon lip 16 to provide the same air seal. Because of its dimensions, filter cap 18 rests flush and firmly on top of cage 12 providing a barrier around the edges, and cannot be easily dislodged.

Perforated top wall 58 permits rough handling of filter cap 18 without causing damage to filter 60, and the entire filter cap can be autoclaved as a unit for continual reuse. Since flange 48 closely envelops the open top of cage 12, there is minimal loss of rack space when cages are in close proximity to each other and the abutting of one filter cap 18 against another filter cap is otherwise likely to dislodge the filter caps from their respective cages.

Since filter cap 18 overlaps and encloses cage 12 and fits snugly thereon, a giant petri dish-like structure is obtained. The overlapping filter cap effectively keeps dust particles, which are the microbiological taxis, out of the case assembly. Accordingly, assembly 10 is essentially a miniature isolator, providing a protected microenvironment within any macroenvironment. Filter 60, while functioning as an effective microbiological barrier, permits a substantial interchange of gases therethrough so that the animals receive a substantial supply of fresh air.

Accordingly, by providing a combination food item and water bottle holder which can be positioned within the cage, an improved cage assembly is obtained which permits the laboratory animal more freedom to move thereabout within the cage. Additionally, by providing a sloped wall within the combination food and water dispenser, both the food item and the water can be more easily received by the laboratory animal. Moreover, by providing a combination food and water dispenser that is provided within the case, the need to remove the water and food items each time access to the laboratory animal is desired is eliminated. By providing a side or rear mounted combination feeder as disclosed herein, increased visibility of the animal is achieved. Lastly, by providing a filter cap that includes a wire bar cover in addition to the retainer member, an improved cage assembly using the combination feeder as disclosed herein can be more effectively used without fear of damage to the air filter.

It will thus be seen that the objects set forth above, among those made apparent from the preceding description, are efficiently attained and, since certain changes may be in the above construction with departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A cage assembly for housing an animal, said cage assembly comprising:

a cage portion, said cage portion having a bottom and at least four intregral walls;

a filter cap, said filter cap including a body portion dimensioned to fit upon and cover over said cage portion, said body portion having a top wall and side and end walls defining an interior region of said body portion;

an air filter disposed in said interior of said body portion and extending across at least a substantial portion of said top wall of said body portion;

a retainer disposed in said interior of said body portion and retaining said air filter at least in close proximity to said top wall of said body portion;

a protective cover disposed in said interior region of said body portion to protect the integrity of said air filter;

a lock for releasably securing said air filter, said retainer and said protective cover within said interior region of said body portion;

a food and liquid dispenser having a first compartment and a second compartment, said first compartment and said second compartment being in adjacent relation to each other, a separator for separating said first compartment from said second compartment, said second compartment being constructed to receive a food item therein and to provide an animal access to said food item disposed therein and said first compartment being constructed to receive a liquid container therein and provide an animal with access to said liquid container disposed in said first compartment;

a bracket assembly affixed to at least one of said first compartment and said second compartment for supporting said dispenser within said cage portion by less than four walls of said cage portion; and said protective cover further including a cap disposed essentially in the center of said protective cover, said cap including a brim and a lid portion, said lid portion contacting said retainer when said cover is releasably secured in said filter cap to further assist in protecting the integrity of said air filter.

2. The cage assembly as claimed in claim 1, wherein said protective cover including a first frame, a plurality of wire bars being affixed to and supported by said first frame, a second frame spaced apart from said first frame, and spacer members connecting said first frame to said second frame.

3. The cage assembly as claimed in claim 1, wherein said filter cap includes a threaded post, said threaded post being integral with said top wall of said body portion and said lock including a nut threadably engageable with said threaded post, each of said air filter, retainer and cap of said protective cover including an aperture therein, each aperture being dimensioned to receive said threaded post.

4. A cage assembly for housing an animal, said cage assembly comprising:

a cage portion, said cage portion having a bottom and at least four integral walls;

a filter cap, said filter cap including a body portion dimensioned to fit upon and cover over said cage portion, said body portion having a top wall and side and end walls defining an interior region of said body portion;

an air filter disposed in said interior of said body portion and extending across at least a substantial portion of said top wall of said body portion;

a retainer disposed in said interior of said body portion and retaining said air filter at least in close proximity to said top wall of said body portion;

a protective cover disposed in said interior region of said body portion to protect the integrity of said air filter;

a lock for releasably securing said air filter, said retainer and said protective cover within said interior region of said body portion;

a food and liquid dispenser having a first compartment and a second compartment, said first compartment and said second compartment being in vertical relation relative to each other; said first compartment and said second compartment being in adjacent relation to each other, a separator for separating said first compartment from said second compartment, said second compartment being constructed to receive a food item therein and to provide an animal access to said food item disposed therein and said first compartment being constructed to receive a liquid container therein and provide an animal with access to said liquid container disposed in said first compartment; and a bracket assembly affixed to at least one of said first compartment and said second compartment for supporting said dispenser within said cage portion by less than four walls of said cage portion.

5. A cage assembly for housing an animal, said cage assembly comprising:

a cage portion, said cage portion having a bottom and at least four integral walls;

a filter cap, said filter cap including a body portion dimensioned to fit upon and cover over said cage portion, said body portion having a top wall and side and end walls defining an interior region of said body portion;

an air filter disposed in said interior of said body portion and extending across at least a substantial portion of said top wall of said body portion;

a retainer disposed in said interior of said body portion and retaining said air filter at least in close proximity to said top wall of said body portion;

a protective cover disposed in said interior region of said body portion to protect the integrity of said air filter;

a lock for releasably securing said air filter, said retainer and said protective cover within said interior region of said body portion;

a food and liquid dispenser having a first compartment and a second compartment, said first compartment and said second compartment being in adjacent relation to each other, a separator for separating said first compartment from said second compartment, said second compartment being constructed to receive a food item therein and to provide an animal access to said food item disposed therein and said first compartment being constructed to receive a liquid container therein and provide an animal with access to said liquid container disposed in said first compartment;

a bracket assembly affixed to at least one of said first compartment and said second compartment for supporting said dispenser within said cage portion by only one wall of said cage portion.

6. A cage assembly for housing an animal, said cage assembly comprising:

a cage portion, said cage portion having a bottom and at least four integral walls;

a filter cap, said filter cap including a body portion dimensioned to fit upon and cover over said cage portion, said body portion having a top wall and side and end walls defining an interior region of said body portion;

an air filter disposed in said interior of said body portion and extending across at least a substantial portion of said top wall of said body portion;

a retainer disposed in said interior of said body portion and retaining said air filter at least in close proximity to said top wall of said body portion;

a protective cover disposed in said interior region of said body portion to protect the integrity of said air filter;

a lock for releasably securing said air filter, said retainer and said protective cover within said interior region of said body portion;

a food and liquid dispenser having a first compartment and a second compartment, said first compartment and said second compartment being in adjacent relation to each other, a separator for separating said first compartment from said second compartment, said second compartment being constructed to receive a food item therein and to provide an animal access to said food item disposed therein and said first compartment being constructed to receive a liquid container therein and provide an animal with access to said liquid container disposed in said first compartment;

a bracket assembly affixed to at least one of said first compartment and said second compartment for supporting said dispenser within said cage portion by less than four walls of said cage portion; and said dispenser being oriented to define a first end and a second end and including a panel coupled to said second end of said dispenser and selectively openable to permit access to the interior of said second compartment.

7. A filter cap for an animal cage, comprising:

a body portion dimensioned to fit upon and cover over the top of the cage, said body portion having a top wall and side and end walls defining an interior region of said body portion;

an air filter disposed in said interior of said body portion and extending across at least a substantial portion of said top wall of said body portion;

a retainer disposed in said interior of said body portion and retaining said air filter at least in close proximity to said top wall of said body portion;

a protective cover disposed in said interior region of said body portion to protect the integrity of said air filter;

a lock for releasably securing said air filter, said retainer and said protective cover within said interior region of said body portion;

said retainer including a border portion, said air filter being held in place by said border portion and at least a portion of said top wall of said body portion when said retainer is releasably secured in said interior region of said body portion; and said retainer including at least one pair of crossed arms extending within the interior of said border portion, said air filter being further held in place against said top wall by said crossed arms and the top wall of said body portion when said retainer is releasably secured in said interior region of said body portion.

8. A combination food and liquid dispenser for an animal cages said dispenser comprising:

a first compartment and a second compartment said first compartment and said second compartment being in vertical relation to each other; a separator for separating said first compartment from said second compartment; said second compartment constructed to receive a food item therein and to provide an animal access to said food item disposed therein; and said first compartment constructed to receive a liquid container therein and provide an animal with access to said liquid container disposed in said first compartment at least one of said first compartment and said second compartment being constructed from a plurality of wire bars, said dispenser being oriented to define a first end and a second end, and wherein said separator is at least in part sloped between said first end and said second end so as to facilitate the flow of liquid through said liquid container disposed in said first compartment; and a panel coupled to said second end of said dispenser and selectively openable to permit access to the interior of said second compartment.

9. The dispenser as claimed in claim 8, wherein said panel is hingedly coupled to said dispenser.

10. A combination food and liquid dispenser for an animal cage, said dispenser comprising:

a first compartment and a second compartment and wherein at least one of said first compartment and said second compartment is constructed from a plurality of wire bars, said first compartment and said second compartment being in vertical relation to each other; a separator for separating said first compartment from said second compartment, said second compartment being constructed to receive a food item therein and provide an animal access to said food item disposed therein; said first compartment being constructed to receive a liquid container therein and provide an animal with access to said liquid container disposed in said first compartment;

said dispenser being oriented to define a first end and a second end, and a panel coupled to said second end of said dispenser and selectively openable to permit access to the interior of said second compartment; and wherein said separator is at least in part sloped between said first end and said second end so as to facilitate the flow of liquid through said liquid container disposed in said first compartment.

11. The dispenser as claimed in claim 10, further including a lid coupled to said dispenser and openable to permit access to the interior of said first compartment.

12. The dispenser as claimed in claim 11, wherein said lid selectively provides access to said first compartment.

13. A filter cap for an animal cage, comprising:
- a body portion dimensioned to fit upon and cover over the top of the cage, said body portion having a top wall and side and end walls defining an interior region of said body portion;
- an air filter disposed in said interior of said body portion and extending across at least a substantial portion of said top wall of said body portion;
- a retainer disposed in said interior of said body portion and retaining said air filter at least in close proximity to said top wall of said body portion;
- a protective cover disposed in said interior region of said body portion to protect the integrity of said air filter, said protective cover including a plurality of intersecting wire bars; and
- a lock for releasably securing said air filter, said retainer and said protective cover within said interior region of said body portion.

14. The filter cap as claimed in claim 13, wherein said protective cover further includes a cap disposed essentially in the center of said protective cover, said cap including a brim and a lid portion, said lid portion contacting said retainer when said cover is releasably secured in said filter cap to further assist in protecting the integrity of said air filter.

15. The filter cap as claimed in claim 14, wherein said protective cover further assists in protecting the integrity of said retainer.

16. The filter cap as claimed in claim 14, wherein said protective cover is coextensive with the interior of the filter body.

17. The filter cap as claimed in claim 14, wherein said protective cover including a first frame, a plurality of wire bars being affixed to and supported by said first frame, a second frame spaced apart from said first frame, and spacer members connecting said first frame to said second frame.

18. The filter cap as claimed in claim 14, wherein said filter cap includes a threaded post, said threaded post being integral with said top wall of said body portion and said lock including a nut threadably engageable with said threaded post, each of said air filter, retainer and cap of said protective cover including an aperture therein, each aperture being dimensioned to receive said threaded post.

* * * * *